United States Patent [19]

Hoppe

[11] Patent Number: 4,837,919
[45] Date of Patent: Jun. 13, 1989

[54] TOOL CHANGING ASSEMBLY FOR UNIVERSAL MILLING AND DRILLING MACHINES

[75] Inventor: Gerd Hoppe, Habichtswald, Fed. Rep. of Germany

[73] Assignee: MAHO Aktiengesellschaft, Pfronten, Fed. Rep. of Germany

[21] Appl. No.: 241,083

[22] Filed: Sep. 6, 1988

[30] Foreign Application Priority Data

Sep. 17, 1987 [DE] Fed. Rep. of Germany ....... 3731280

[51] Int. Cl.$^4$ ............................................. B23Q 3/157
[52] U.S. Cl. .................................... 29/568; 414/744.5
[58] Field of Search ........................... 29/568; 901/21; 414/738, 779, 732, 733, 744.5, 744.4, 744.6

[56] References Cited

U.S. PATENT DOCUMENTS

| | | | |
|---|---|---|---|
| 3,348,298 | 10/1967 | Sedgwick | 29/568 |
| 3,633,764 | 1/1972 | Nordmann | 414/738 |
| 4,312,111 | 1/1982 | Peiser et al. | 29/568 |
| 4,728,252 | 3/1988 | Lada et al. | 414/744.5 |

FOREIGN PATENT DOCUMENTS

| | | | |
|---|---|---|---|
| 28735 | 5/1981 | European Pat. Off. | |
| 2110943 | 9/1972 | Fed. Rep. of Germany | |
| 86286234 | 5/1987 | Fed. Rep. of Germany | |
| 47-9676 | 3/1972 | Japan | 29/568 |
| 1408131 | 10/1975 | United Kingdom | 29/568 |

Primary Examiner—Gil Weidenfeld
Assistant Examiner—Daniel W. Howell
Attorney, Agent, or Firm—Baker, Maxham, Jester & Meador

[57] ABSTRACT

A tool changing assembly for program controlled milling and drilling machines comprising a vertically movable knee-type unit for the work table, and a vertical milling head. The tool changing assembly includes a power-driven pivotable mounting which is arranged in the form of a bracket for pivoting movement about a vertical axis on a column mounted on the knee-type unit laterally spaced from the work spindle of the milling head. The free end of the bracket has gripping pliers mounted thereon for pivoting movement about a likewise vertical axis, the pivoting movement of the gripping pliers being opposite to the pivoting movement of the bracket and being derived therefrom.

6 Claims, 4 Drawing Sheets

TOOL CHANGING ASSEMBLY FOR UNIVERSAL MILLING AND DRILLING MACHINES

FIELD OF THE INVENTION

The present invention is directed to a tool changing assembly for program controlled universal milling and drilling machines having a vertically movable carriage for the work table and a vertical milling head. The carriage includes power-driven, pivotably mounted, gripping pliers movably supported at the free end thereon, the gripping pliers transferring the selected tools from the transfer position of the horizontal tool magazine to the work spindle, and vice versa.

BACKGROUND OF THE INVENTION

Tool changing assemblies for automated changing of tools, together with corresponding tool magazines, are essential parts of modern program-controlled machine tools, because they permit continuous complex machining even of complicated works by means of different tools. The changing steps themselves and the motions required to this end from the changing device and the tool magazine, respectively, are controlled by the controller of the machine tool in accordance with the set program. Due to their outstanding importance to the machining performance in the respective machine tool, a variety of different types and designs of tool changing assemblies have been developed in recent years, those assemblies being adapted to a greater or lesser extent to the design and mode of operation of the associated machine tool. A requirement common to all known designs of tool changing assemblies is that the various changing operations must be performed within the shortest possible time so that the necessary idle times of the machine are minimized. As a rule, this requirement is satisfied only by correspondingly complex machines. This complexity is due to the dimensions of the drive units and the moving parts as well as the control means. The costs of such efforts may by justified in the case of large machining centers, but for smaller machine tool operations, this large cost is often not acceptable by customers and users.

An example of a related machine is shown in German Gebrauchsmuster No. 86 28 623.4 which discloses a tool changing assembly for program controlled universal milling and drilling machines, the assembly serving both the vertical and the horizontal spindle. A horizontal cross-member is rigidly mounted in a sidewall of the machine stand. A bracket is supported on the cross-member for axial movement and power-driven pivoting movement within a predetermined angular range. This bracket, which is arranged parallel with the wall of the stand, has a rearwardly right-angularly bent support member mounted thereon for rotation therewith and for movement in the axial direction. The support member carries a cross-arm which is rotatable about the longitudinal axis thereof and has gripping pliers disposed perpendicularly to the longitudinal axis of the cross-arm. In this known tool changing assembly the bracket, the support member mounted on the end thereof, the cross-arm and the gripping pliers perform different movements during each changing process, those movements being respectively generated by separate drive units. The arms, which are designed for extremely fast and accurate movements, and the correspondingly dimensioned drive units together with their hydraulic and electric power supply means, necessitate considerable technical effort.

SUMMARY OF THE INVENTION

It is an object of the present invention to provide a tool changing assembly for program controlled milling and drilling machines including a knee-type unit for the work table, and a vertical milling head. The assembly is of compact and simple design, and is especially for use with smaller machine tools.

In accordance with the present invention the above-mentioned object is provided by the features that the bracket for the gripping pliers is mounted for pivoting movement about a vertical axis on a vertical column, which column is laterally spaced from the axis of the work spindle, and is provided on the knee-type unit for the work table, and that the gripping pliers mounted on the free end of this bracket is pivotable about a likewise vertical axis.

The tool changing assembly designed in accordance with the present invention has only two primary component mechanisms which perform separate pivoting movements. The arrangement of the column on the vertically movable knee-type unit of the work table permits movements of the entire tool changing assembly for inserting and removing the individual tools into and from the work spindle and the tool magazine, respectively, without requiring separate drive units.

A further structural simplification of the tool changing assembly and the control of the movements thereof is characterized in that the pivoting movement of the gripping pliers about the vertical axis is derived from the pivoting movement of the mounting which is designed as a bracket. Such deriving of the horizontal movement of the gripping pliers may be performed by suitable transmissions such as, in particular, chains, toothed belts, gear trains or bevel gears including spacer shafts, toothed racks or the like. When chains or toothed belts are used, this transmission element is fixed at either end to a member which is firmly joined to the column, and the transmission element is trained about a gear secured to the vertical drive shaft of the gripping pliers. A pivoting movement of the bracket about the center axis of the vertical column, which movement is produced by an hydraulic or pneumatic actuating cylinder or by a toothed rack, causes a corresponding rotation of the gear and therefore the gripping pliers about a predetermined angle via the chain or the toothed belt. The lengths of bracket and gripping pliers are matched with each other such that the gripping pliers at the end of their respective pivoting movement are advanced at least approximately radially toward the vertical axis of the milling head or, respectively, the tool holder of the tool magazine disposed in the tool changing position.

In accordance with a further advantageous feature of the invention the vertical shaft of the horizontal gripping pliers is carried in a coaxial extension at the free end of the bracket, so that the gripping pliers may perform a pivoting movement opposite to that of the bracket without any risk of interference or collision of machine tool elements.

The essential advantage of the tool changing assembly in accordance with the present invention resides in its simple constructional design and in the small number of moving parts. Only a single stationary actuator is required, which may be mounted either on or within the column and which does not pose any problems in its requirement for a supply of power.

BRIEF DESCRIPTION OF THE DRAWING

The objects, advantages and features of the invention will be more clearly perceived from the following detailed description when read in conjunction with the accompanying drawing, in which.

DETAILED DESCRIPTION OF THE PREFERRED EMBODIMENT

Figure 2:
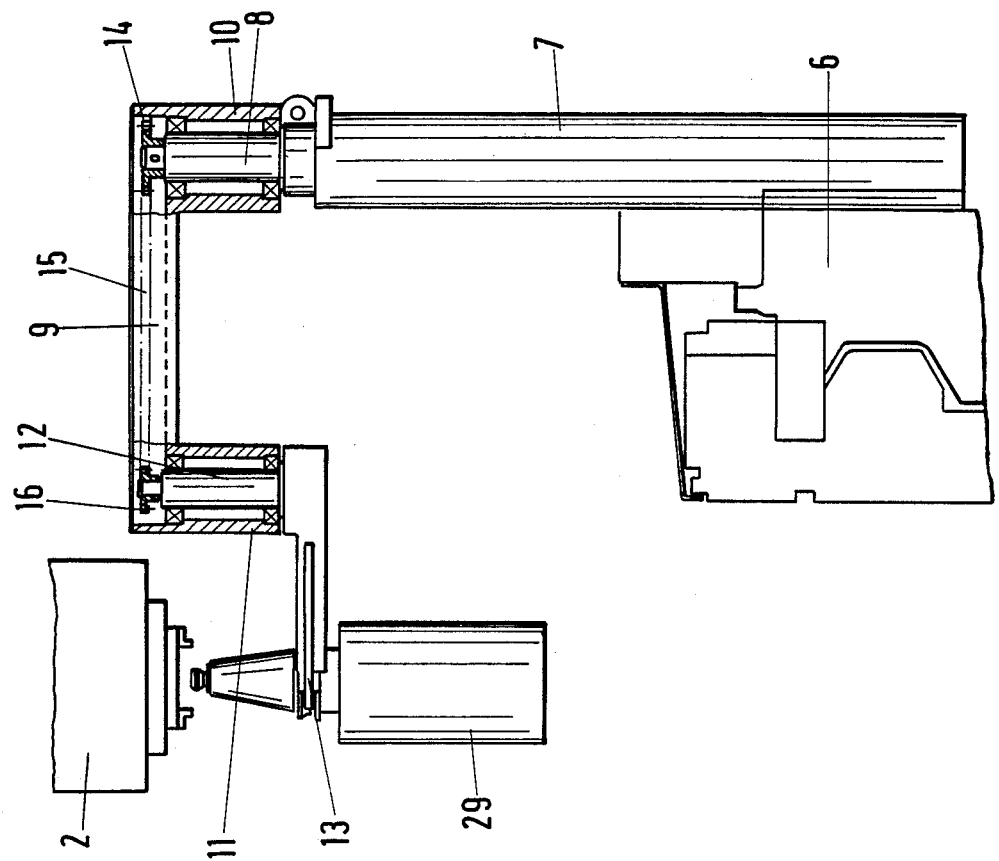
FIG. 2 is a side view of the tool changing assembly of FIG. 1 with a partly sectional view of the bracket.

The illustrated tool changing assembly is designed for use with a milling and drilling machine, horizontally movable headstock 1 (FIGS. 3 and 4) of which carries at its face vertical milling head 2 with rotatably driven work spindle 3 mounted therein. Vertical guide members 4 of machine stand 5 guide knee-type unit 6 (FIGS. 2, 3, and 4) for power driven up and down movement. The knee-type unit carries at one side thereof, spaced from the axis of the work spindle, vertically upwardly directed column 7. In the illustrated embodiment, as shown in FIG. 2, horizontal bracket 9 is mounted on central journal 8 of column 7 by way of hollow cylindrical bearing extension 10. The opposite end of bracket 9 terminates in a likewise vertical, hollow cylindrical bearing extension 11 in which journal 12 of a pair of horizontal gripping pliers 13 is centrally mounted. Chain wheel or cog 14, about which endless chain 15 is trained, is splined to the upper tapered end of journal 8 for rotation therewith, that journal being fixed to column 7. Chain 15 moves about toothed wheel or cog 16 which is splined to the tapered end portion of journal 12 for rotation therewith.

Figure 1:
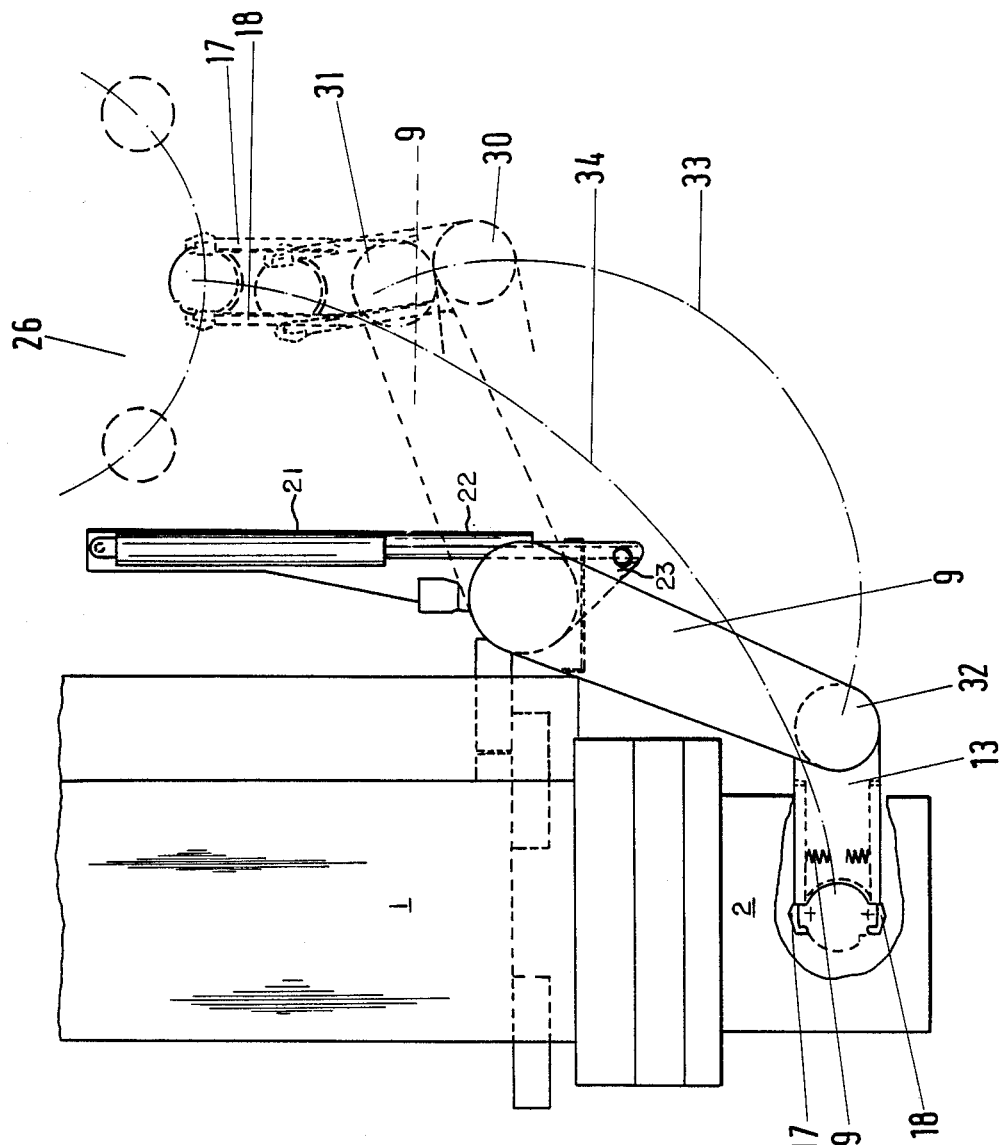
FIG. 1 is a schematic plan view of a tool changing assembly of the invention showing the paths of movement of its swivel arm and the gripping pliers.

As will be apparent from FIG. 1, gripping pliers 13 comprise two laterally deflectable gripper members 17 and 18 which are biased inwardly by spring 19 extending transversely in the gripping pliers. The gripping pliers have bevelled surfaces on their gripper members causing the pliers to be spread apart against the tension force of spring 19 when the pliers are moved toward the respective machine taper.

Figure 3:
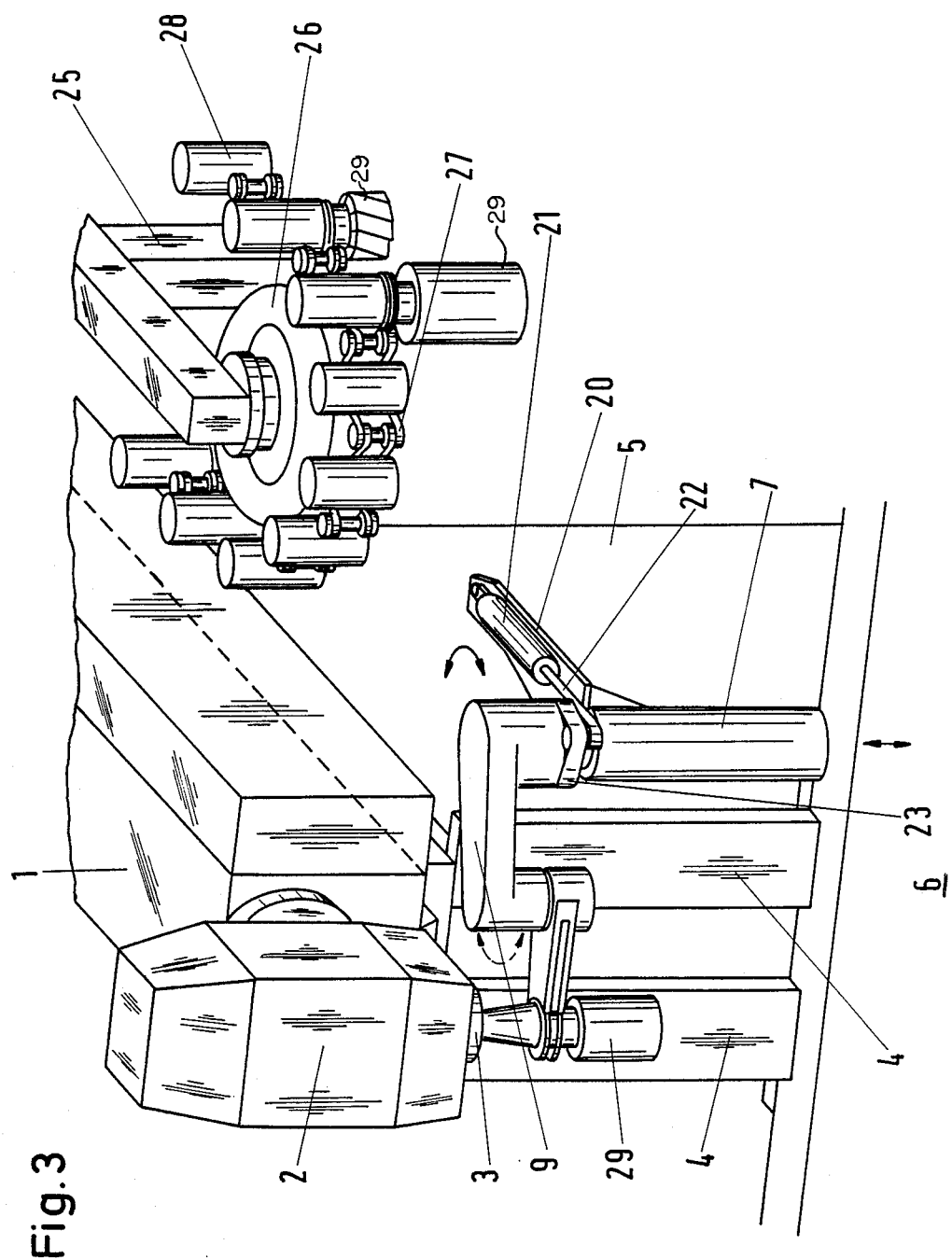
FIG. 3 is a perspective view of the tool changing assembly during placement of a tool in or removal from the vertical milling head.
Figure 4:
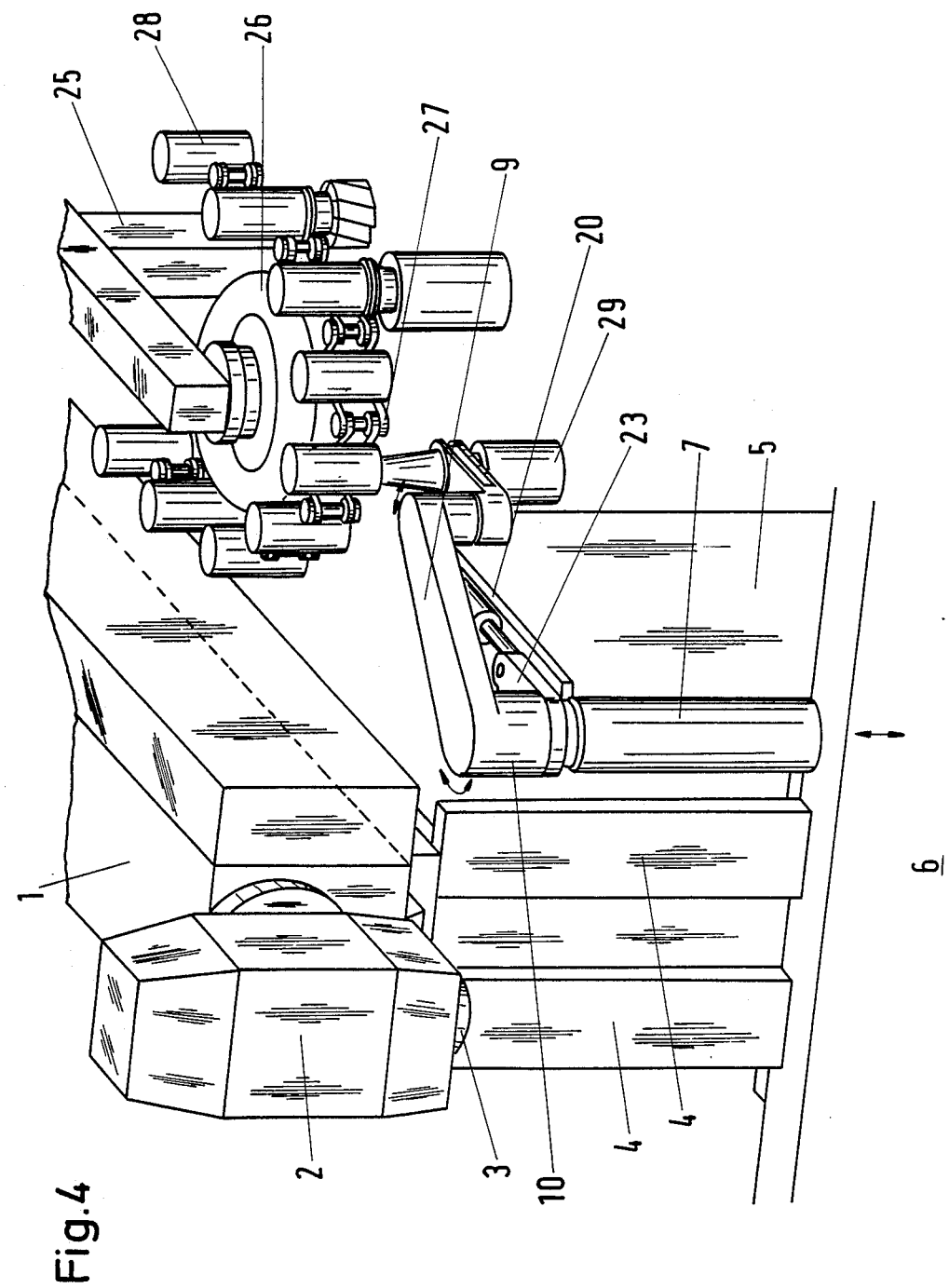
FIG. 4 is a perspective view similar to FIG. 3 showing tool placement in or removal from a horizontally disposed chain-type magazine.

As will be apparent from FIGS. 1, 3 and 4, horizontal bracket 9 is fixedly mounted on column 7, which column has the rear end of actuating cylinder 21 pivotally mounted thereon. Piston rod 22 of the cylinder is in hinged engagement with radial lug 23. This radial lug 23 is fixed for rotation with bearing extension 10 of bracket 9.

Tool magazine 25 is disposed horizontally adjacent the headstock. Chain 27 of the magazine, which is trained about front chain wheel 26, carries hollow cylindrical sleeves 28 into which tools 29 with their standardized tapers are pushed vertically upwardly into a tool holder.

Changing operations will now be described with reference to the drawing. For every changing operation knee-type unit 6 of the work table (not illustrated), which carries column 7, is moved to a changing position in which the pivoting motions of the parts of the changing assembly cannot interfere or collide with other structural parts. In this state bracket 9 has the inoperative position 30 indicated in FIG. 1. To load still empty work spindle 3, bracket 9 is pivoted by means of a predetermined retracting movement of piston rod 22 into position 31, in which the two gripper members 17 and 18 are centered on the central axis of tool 29, which is in the foremost changing position of tool magazine 25, and embrace the sides of the machine taper of the respective tool 29. By a vertical movement of knee-type unit 6 in the downward direction, tool 29 with its machine taper is pulled from hollow-cylindrical protective sleeve 28 of the tool magazine. As soon as the machine taper is completely free of the protective sleeve, bracket 9 is again pivoted to position 32 shown in FIG. 1, the axis of journal 12 moving along circular arc 33. This pivoting movement of bracket 9 is translated by chain drive assembly 14, 15 and 16 into an oppositely directed pivoting movement of gripping pliers 13, during which tool 29 with its vertical axis moves along arcuate path 34. The lengths of bracket 9 and gripping pliers 13, as well as the ratios of the chain drive, are selected and matched with each other in such a way that gripper members 17 and 18 move tool 29 radially into the axis of work spindle 3. By a vertical movement of knee-type unit 6 in the upward direction along guide members 4 tool 29 is mounted by having its machine taper chucked into the work spindle. Thereafter bracket 9 returns to its inoperative position 30, gripper members 17 and 18 being spread apart by means of bevelled surfaces to be thereby removed from the machine taper.

Removal of an "old" tool from the work spindle, loading of that tool in a free space of the tool magazine, and chucking a fresh tool from the magazine in the work spindle are performed correspondingly.

The invention is not limited to the illustrated embodiment. For example, column 7 may by rotatably mounted within the knee-type unit and fixed for rotation with bracket 9, thus permitting actuator 21 and 22 to be concealed within the knee-type unit. But in this embodiment a different transmission for deriving the pivoting motion of gripping pliers 13 from the pivoting motion of bracket 9 is required. Furthermore, it is also possible to use other drive units such as electric or hydraulic motors instead of actuating cylinder 21 and 22. The chain and chain wheel assembly could well be a belt and pulley, a toothed belt and cog apparatus, or gear trains, which may be referred to generally as an endless flexible belt and cog wheel arrangement.

In view of the above description, it is likely that modifications and improvements will occur to those skilled in the relevant art which are within the scope of the appended claims.

What is claimed is:

1. A tool changing assembly for program controlled milling and drilling machines generally having a vertical milling head with a work spindle having an axis, a vertically movable knee-type unit and a tool magazine having a plurality of tool holders thereon, said tool magazine being horizontally disposed laterally behind the milling head, said assembly comprising:

a vertical column mounted to said knee-type unit for vertical motion therewith;

bracket means mounted at one end to said vertical column for horizontally pivotable movement;

gripping plier means coupled to the end of said bracket, means spaced from said one end, said plier means having means for selectively gripping tool elements;

means mounted to said vertical column and coupled to said bracket for selectively rotating said bracket through a predetermined arc; and driving means coupled to said bracket means for rotating said plier means in a direction opposite to the direction of rotation of said bracket means resulting from the pivoting movement of said bracket means;

said plier means being adapted to transfer a tool element between said tool magazine and said work spindle.

2. The tool changing assembly recited in claim 1, wherein said driving means comprises:

an endless flexible belt;

a cog wheel coupled to said vertical column; and a cog wheel coupled to said plier means, said endless flexible belt being wrapped around said cog wheels.

3. The tool changing assembly recited in claim 1, wherein said selective rotating means comprises a piston rod and cylinder arrangement, one element being connected to said vertical column and the other element being coupled to said bracket means, whereby movement of said piston rod with respect to said cylinder causes rotation of said bracket means.

4. The tool changing assembly recited in claim 2, wherein said selective rotating means comprises a piston rod and cylinder arrangement, one element being connected to said vertical column and the other element being coupled to said bracket means, whereby movement of said piston rod with respect to said cylinder causes rotation of said bracket means.

5. The tool changing assembly recited in claim 4, wherein the lengths of said bracket means and said pliers, together with the ratios of said belt and cog wheel assembly, are so configured that said pliers move a tool radially from the axis of a tool holder in said tool magazine to coincide with the axis of said work spindle.

6. The tool changing assembly recited in claim 1, wherein said driving means comprises:

an endless chain;

a first toothed wheel mounted to said column; and a second toothed wheel coupled to said plier means;

said chain engaging said first and second toothed wheels whereby relative rotation of one toothed wheel with respect to said bracket. means causes the other to rotate.

* * * * *